United States Patent
Jeon

(10) Patent No.: US 10,039,243 B2
(45) Date of Patent: Aug. 7, 2018

(54) SELF-WATERING SYSTEM FOR PLANT

(71) Applicant: John Heungman Jeon, Irvington, NY (US)

(72) Inventor: John Heungman Jeon, Irvington, NY (US)

( * ) Notice: Subject to any disclaimer, the term of this patent is extended or adjusted under 35 U.S.C. 154(b) by 214 days.

(21) Appl. No.: 14/805,805

(22) Filed: Jul. 22, 2015

(65) Prior Publication Data

US 2017/0020093 A1  Jan. 26, 2017

(51) Int. Cl.
*A01G 27/06* (2006.01)
*A01G 27/04* (2006.01)

(52) U.S. Cl.
CPC .............. *A01G 27/06* (2013.01); *A01G 27/04* (2013.01)

(58) Field of Classification Search
CPC ...... A01G 27/04; A01G 27/06; A01G 27/005; A01G 27/006; A01G 27/00
See application file for complete search history.

(56) References Cited

U.S. PATENT DOCUMENTS

| | | | | |
|---|---|---|---|---|
| 3,220,144 A * | 11/1965 | Green | ................... | A01G 27/06 47/80 |
| 3,738,060 A * | 6/1973 | Jullien-Davin | ...... | A01G 27/006 47/47 |
| 3,739,523 A * | 6/1973 | Tuffli | ..................... | A01G 27/04 47/47 |
| 3,871,131 A * | 3/1975 | Berglund | ............... | A01G 27/04 116/227 |
| 4,115,951 A * | 9/1978 | Becker | ................... | A01G 27/06 220/86.1 |
| 4,175,356 A * | 11/1979 | Allen | ....................... | A01G 7/00 47/48.5 |
| 4,397,114 A * | 8/1983 | Skaife | ...................... | A01G 9/02 47/62 C |
| 4,528,774 A * | 7/1985 | Skaife | ...................... | A01G 9/02 47/81 |
| 5,050,343 A * | 9/1991 | Henttonen | ............. | A01G 25/06 47/79 |
| 5,167,672 A * | 12/1992 | Farrell | ..................... | A01G 5/06 47/41.13 |
| 5,918,415 A * | 7/1999 | Locke | .................... | A01G 27/00 119/74 |
| 6,243,986 B1 * | 6/2001 | Crowley | .............. | A01G 27/006 47/48.5 |

(Continued)

*Primary Examiner* — Kathleen I Alker
(74) *Attorney, Agent, or Firm* — Park & Associates IP law, P. C.

(57) ABSTRACT

A self-watering system includes a watering member, a pot support member, and a water container member. The watering member includes a support tube member and a water transfer member. The supporting member includes a head portion, a body portion, and a bottom portion. The head portion has a conical shape. The body portion has a hollow cylindrical shape, and includes a body groove formed in a longitudinal direction and at least one air hole formed in the body groove. The water transfer member serves to absorb water and transfer the water to soil and a root of a plant in a pot. The pot support member serves to support the pot, and includes a fixing hole. The water container member stores water to be absorbed by the water transfer member. The watering member is fixed to the pot support member such that the bottom portion is inserted into the fixing hole of the pot support member.

16 Claims, 6 Drawing Sheets

(56) References Cited

U.S. PATENT DOCUMENTS

| | | | | |
|---|---|---|---|---|
| 6,321,487 | B1* | 11/2001 | Sardanelli | A01G 27/04 47/81 |
| 6,370,819 | B1* | 4/2002 | Reiss | A01G 27/06 47/79 |
| 6,675,532 | B2* | 1/2004 | Fidotti | A01G 27/006 47/79 |
| 8,347,552 | B1* | 1/2013 | Johnson, III | A01G 9/042 47/81 |
| 2002/0088177 | A1* | 7/2002 | Gergek | A01G 27/003 47/79 |
| 2009/0064576 | A1* | 3/2009 | Sugarek | A01G 27/04 47/81 |
| 2013/0333780 | A1* | 12/2013 | Chan | A01G 27/04 137/561 R |

* cited by examiner

SELF-WATERING SYSTEM FOR PLANT

FIELD OF THE INVENTION

The present invention relates to a self-watering system, and more particularly, to a self-watering system that supplies water to a plant in a pot automatically.

BACKGROUND OF THE INVENTION

In general, watering cans with a handle and a spout are used to water plants manually.

In this case, since water is supplied downward from the watering can, water may flow over a pot, and soil may escape from the pot together with water. Further, since supplied water easily drains through a hole formed in the bottom of the pot, it is necessary to water a plant frequently, and thus it is inconvenient.

In addition, for people who are not familiar with gardening or plant growing, it is difficult to know when it is the appropriate time to water a plant in a pot. Therefore, a plant may die if too much or too little water is supplied.

Accordingly, it is desirable to provide a self-watering system capable of supplying water to a plant in a pot automatically and stably while increasing the amount of water absorbed by the roots of a plant.

SUMMARY OF THE INVENTION

According to an aspect the present invention, a self-watering system includes: a watering member including a support tube member and a water transfer member, the support tube member including a head portion, a body portion, and a bottom portion, the head portion having a shape in which a diameter of a top portion is smaller than a diameter of a bottom portion and including a front groove formed in a height direction, the body portion having a hollow cylindrical shape and including a body groove formed in a longitudinal direction and at least one air hole formed in the body groove, the bottom portion having a fixing recess formed along an outer circumference, the water transfer member serving to absorb water and transfer the water to soil and a root of a plant in a pot and a length larger than a length of the support tube member; a pot support member serving to support the pot and including a fixing hole; and a water container member storing water to be absorbed by the water transfer member, wherein the diameter of the bottom portion of the head portion is larger than a diameter of the support tube member of the watering member, the watering member is fixed to the pot support member such that the bottom portion is inserted into the fixing hole of the pot support member.

The self-water system may further include a grid member including a grid and a fixing hole, wherein the fixing hole of the grid member has a diameter large enough to allow insertion of the watering member.

The support tube member of the watering member and the pot support member may be made of polypropylene.

The water transfer member may be made of a material capable of absorbing and transferring water.

The water transfer member may be made of non-woven fabric, felt, or sponge.

The head portion of the support tube member of the watering member may have a conical shape.

The support tube member may include at least a first support tube member and a second support tube member.

The first supporting tube member may include a first head portion, a first body portion, and a first bottom portion. The first head portion may include a first front groove and a first front coupling protrusion, the first body portion may include a first body groove formed in a longitudinal direction, at least one first air hole formed in the first body groove, and a first body coupling protrusion, and the first bottom portion may include a first rear fixing recess. The second supporting tube member may include a second head portion, a second body portion, and a second bottom portion. The second head portion may include a second front groove and a second front coupling recess, the second body portion may include a second body groove formed in a longitudinal direction, at least one second air hole formed in the first body groove, and a second body coupling recess, and the second bottom portion may include a second rear fixing recess formed on an outer circumference. The support tube member of the watering member may be configured by coupling the first support tube member with the second support such that the first front coupling protrusion and the first body coupling protrusion are inserted into the second front coupling recess and the second body coupling recess.

The pot support member may be configured to be placed on the water container member.

The water container member may be configured to be placed below the pot support member.

A length of the water transfer member may be equal to or larger than a length of the support tube member of the watering member.

According to an embodiment of the present invention, it is possible to provide a self-watering system capable of supplying water to a plant in a pot automatically and stably while increasing an amount of water absorbed by the roots of a plant.

BRIEF DESCRIPTION OF THE DRAWINGS

FIGS. 3A and 3B are exploded views illustrating the support tube member formed with halves thereof according to another embodiment of the present invention, in which FIG. 3A shows inner sides of the halves, and FIG. 3B shows outer sides of the halves;

DETAILED DESCRIPTION OF THE INVENTION

Hereinafter, exemplary embodiments of the present invention will be described in detail with reference to the appended drawings.

Figure 1:
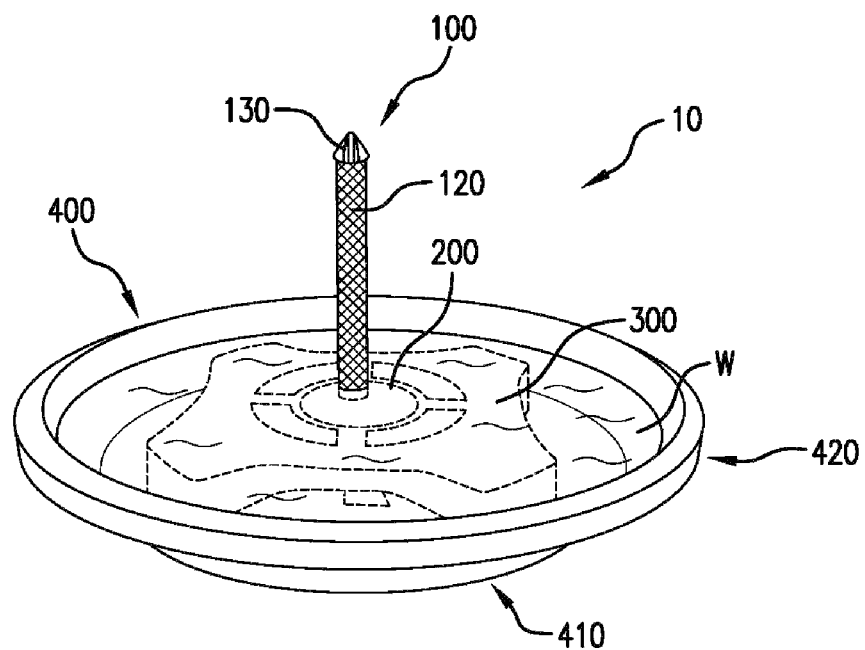
FIG. 1 is a perspective view illustrating a self-watering system according to an embodiment of the present invention.

FIG. 1 is a perspective view illustrating a self-watering system according to an embodiment of the present invention. The self-watering system 10 includes a watering member 100, a grid member 200, a pot support member 300, and a water container member 400.

Figure 4:
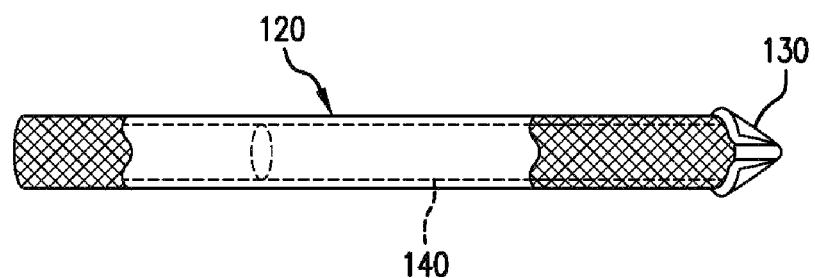
FIG. 4 is a schematic diagram illustrating the watering member according to an embodiment of the present invention.
Figure 5:
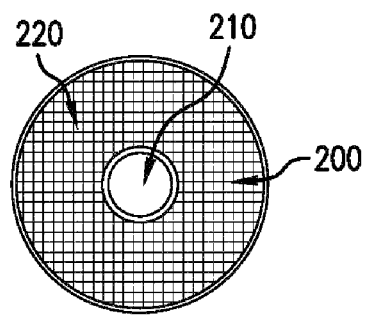
FIG. 5 is a plan view illustrating the grid member according to an embodiment of the present invention.

The watering member 100 includes a support tube member 110 and a water transfer member 120 in sheathing structure over the support tube member 110 (see FIG. 4). The support tube member 110 includes a head portion 130, a body portion 140, and a bottom portion 150. The head portion 130, the body portion 140, and the bottom portion 150 are preferably formed as a single body, but may be formed separately. When formed separately, the head portion 130, the body portion 140, and the bottom portion 150 may be coupled with one another in a certain manner. For example, the bottom of the head portion 130 may have a female screw thread, the top of the body portion 140 may have a male screw thread, and the head portion 130 may be screw-coupled with the body portion such that the female screw thread is coupled with the male screw thread. Similarly, the body portion 140 may be coupled with the bottom portion 150. In the present embodiment, the head portion 130, the body portion 140, and the bottom portion 150 are assumed to be formed as a single body.

The head portion 130 has a conical shape or similar configuration for easy insertion into the pot soil (S). A side groove 131 is optionally (or preferably) formed in a height or longitudinal direction of the head 130, and serves to guide external air to the roots of a plant (P) together with a body groove 142 (which will be described later) formed in the body portion 140.

Preferably, a maximum diameter at the bottom surface of the head portion 130 is larger than a diameter of the body portion 140. More preferably, the maximum outer diameter at the bottom surface of the head portion 130 is equal to or larger than the sum of the diameter of the body portion 140 and the sheathing thickness of the water transfer member 120 when the support tube member 110 wears the water transfer member 120, which is typically a wick, as illustrated in FIG. 4. If the maximum diameter of the head portion 130 is smaller than the sum of the outer diameter of the body portion 140 and the (two) sheathing thickness of the water transfer member 120, the water transfer member 120 is likely to be pushed down by friction with soil (S) when the watering member 100 in which the support tube member 110 is wearing the water transfer member 120 is inserted into the pot through a hole formed in the bottom of the pot.

The head portion 130 may have any other shape as long as the diameter at the leading portion is smaller than the diameter at the tailing portion of the head 130. For example, the head portion 130 may have a conical or taper shape whose top is cut or a polygonal pyramid such as a triangular pyramid or a quadrangular pyramid.

The body portion 140 has a hollow cylindrical tube shape, and includes air holes 141 and one or more body groove 142.

Figure 2:
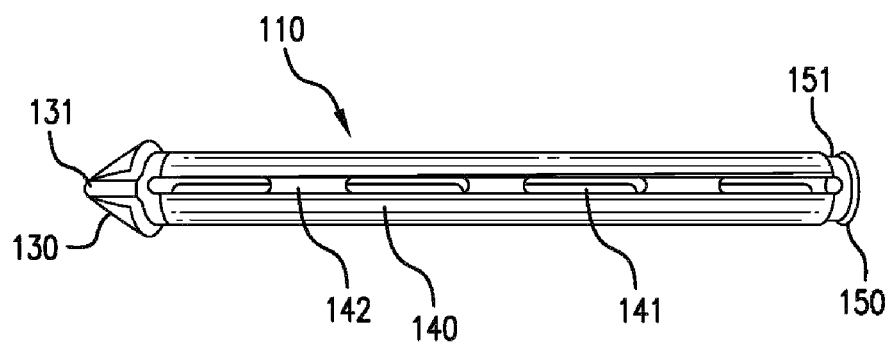
FIG. 2 is a side view illustrating the support tube member according to an embodiment of the present invention.

The body groove 142 is formed in a longitudinal direction of the body portion 140, and at least one or more air holes 141 are formed in the middle of the body groove 142. The body groove 142 is formed to communicate with the side groove 131. The air hole 141 and the body groove 142 are in fluid communication with the inner space of the body portion 140, and serve to supply and guide external air to the soil and roots of a plant (P) together with the side groove 131. Further, the air hole 141 and the body groove 142 also help the water transfer member 120 absorb water (W) and supply the water to the roots of the plant together with the space formed in the body portion 140. Although FIG. 2 shows the body portion 140 having both the air holes 141 and body grooves 142, the invention is not limited thereto. For example, the body portion 140 may optionally have only air holes 141 formed along the body surface without having the body grooves 142.

The bottom portion 150 serves to fix the support tube member 110 to the pot support member 300. The bottom portion 150 includes a rear fixing configuration (e.g., recess 151) formed thereon. The rear fixing recess 151 has a circular shape formed along an outer circumference of the bottom portion 150.

The support tube member 110 having the above configuration may have various sizes and widths depending on the height and widths of the pot. Preferably, the length of the support tube member 110 is relatively long if the height of the pot is high, and the diameter of the support tube member 110 is relative large if the width of the pot is large. The support tube member 110 has a length (L) ranging, preferably, from one third (⅓) to two third (⅔) of the height of the pot, and more preferably, about on half (½) of the height of the pot. The inner hole of the support tube member 110 has a diameter (∅) ranging from 0.5 mm to 30 mm.

The water transfer member 120 serves to absorb water in the water container member 400 and transfer the water to be supplied to the roots of the plant by capillary phenomenon. The water transfer member 120 is made of a material capable of absorbing and transmitting water, for example, non-woven fabric, felt, or sponge. The length of the water transfer member 120 is preferably longer than the length of the body portion 140 as illustrated in FIG. 4.

Figure 6:
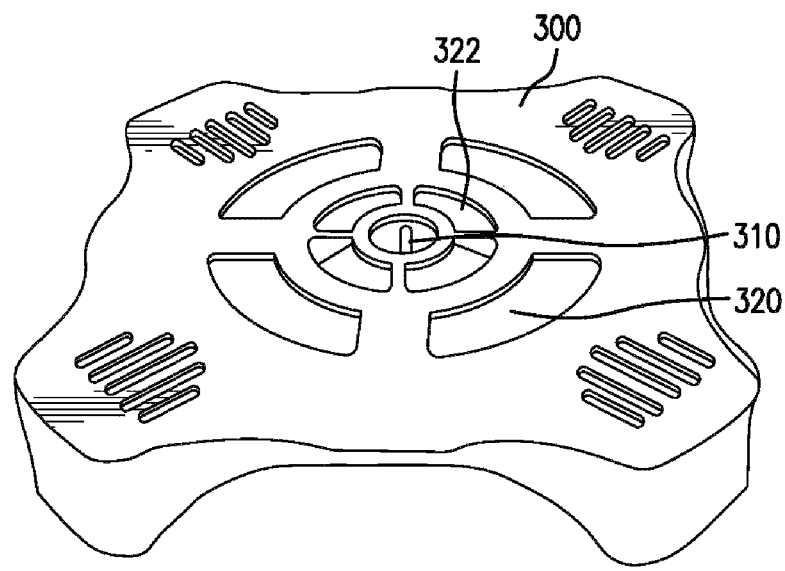
FIG. 6 is a perspective view illustrating the pot support member according to an embodiment of the present invention.

The pot support member 300 serves to support the pot and also fixes the support tube member 110 thereto. The pot support member 300 includes a central fixing hole 310 and drain holes 320 and 322 as illustrated in FIG. 6. The support tube member 110 is fixed to the pot support member 300 such that the bottom portion 150 is inserted into the fixing hole 310.

The pot support member 300 further includes a plurality of legs 330 and a plurality of fixing support protrusions 340. The legs 330 serve to support the pot support member 300, and the fixing support protrusions 340 help to firmly fix the watering member 100 and guide the water transfer member 120 when the watering member 100 is inserted into the fixing hole 310 of the pot support member 300. The pot support member 300 has a rectangular or square shape at a plane view, but may have any other shape such as a circular shape at a plane view.

Figure 6A:
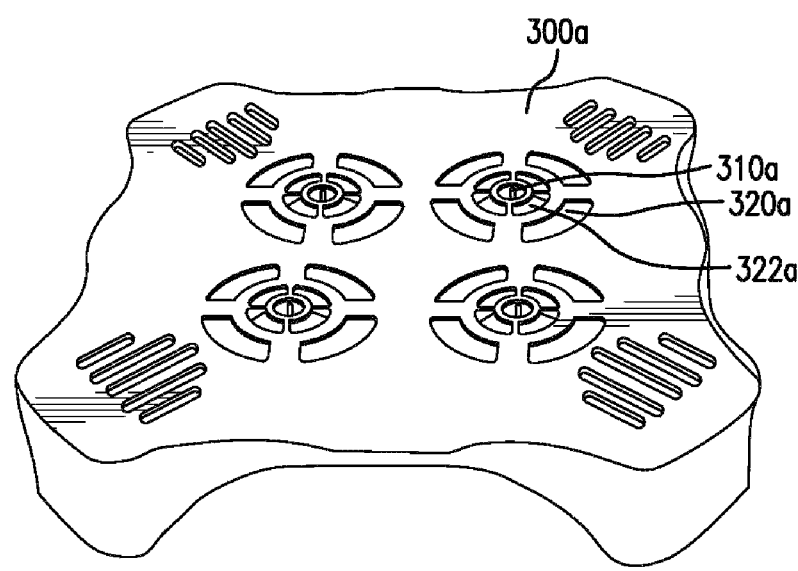
FIG. 6A is a perspective view illustrating the pot support member according to another embodiment of the present invention.
Figure 7:
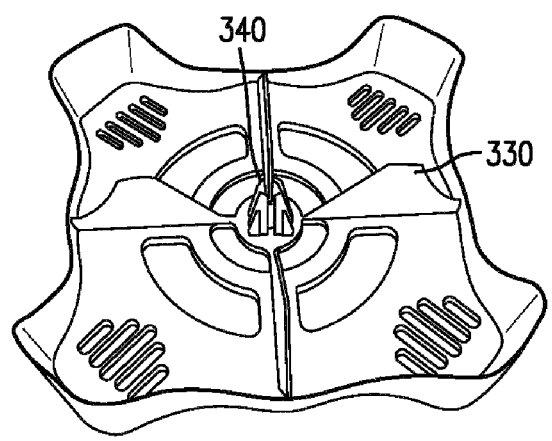
FIG. 7 is a bottom perspective view illustrating the pot support member according to the embodiment of FIG. 6.
Figure 8:
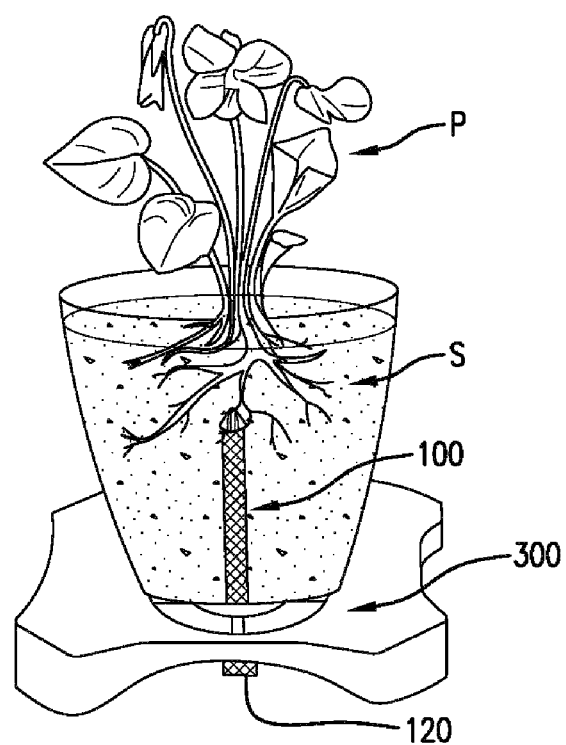
FIG. 8 is a schematic diagram illustrating a state in which the self-watering system is installed in a pot according to an embodiment of the present invention.

FIGS. 1 and 6 show the pot support member 300 having only one fixing hole 310 to which a single watering member 100 is installed. However, the invention is not limited to this configuration, and the pot support member can have a larger size with a plurality of fixing holes formed for fixing plural watering members to accommodate a bigger pot thereto. FIG. 6A illustrates one example of such pot support member for watering a bigger pot, in which the pot support member 300a includes a plurality of (e.g., four) fixing holes 310a and corresponding plural (e.g., four) sets of drain holes 320a and 322a suitably disposed around their respective fixing hole. Thus, the pot support member 300a can hold four watering members 100 (not shown) fixed through the four fixing holes 310 in the same manner described above, and with the grid member 200 positioned on the pot support member 300a to cover each set of the drain holes 320a and 322a in the manner as described below. In this case, the four watering members 100 are configured to stand upright in generally parallel relation to each other.

The grid member 200 has a grid shape and includes a fixing hole 210 and a grid 220. The grid 220 is configured to place on the pot support member 300 or 300a to cover at least a portion of the drain holes 320 and 322 (or 320a and 322a), and serves to prevent soil from escaping the pot through the hole formed in the bottom of the pot and into the water container member 400. The grid member 200 further serves to fix the watering member 100 such that the rear fixing recess 151 of the bottom portion 150 is fitted into the inner circumferential surface of the fixing hole 210. Thus, the fixing hole 210 is formed to have a diameter corresponding to a diameter of the rear fixing recess 151 of the bottom portion 150.

The water container member 400 serves to store water to be supplied to the plant through the watering member 100. The water container member 400 includes a bottom portion 410 and a sidewall portion 420.

Figure 9A:
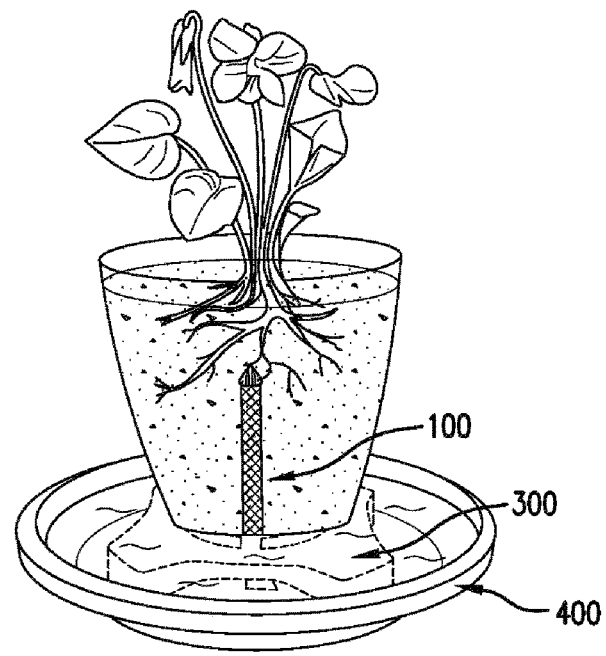
FIG. 9A is a schematic diagram illustrating an example in which the pot support member is placed on the water container member according to one embodiment of the present invention.
Figure 9B:
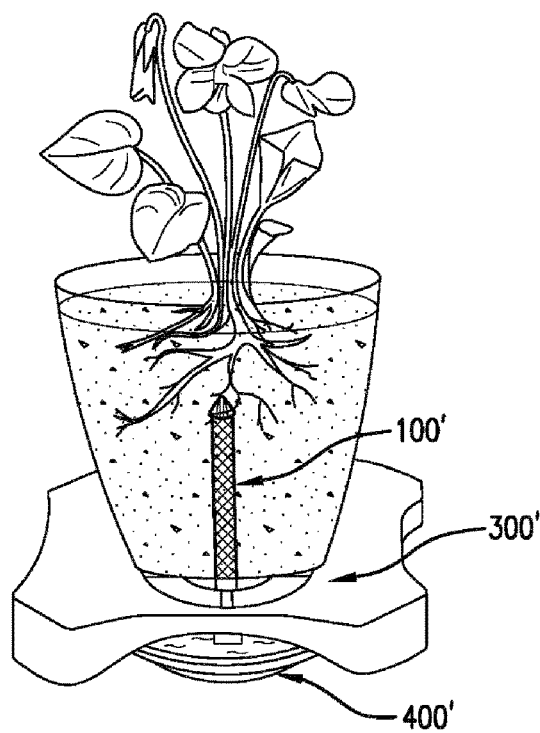
FIG. 9B is a schematic diagram illustrating another example in which the water container member is placed below the pot support member according to another embodiment of the present invention.

The water container member 400 may be configured to accommodate the pot support member 300 as illustrated in FIG. 9A or to be placed below the pot support member 300 as illustrated in FIG. 9B.

The support tube member 110, the grid member 200, the pot support member 300, and the water container member 400 are preferably made of polypropylene.

Figure 3A:
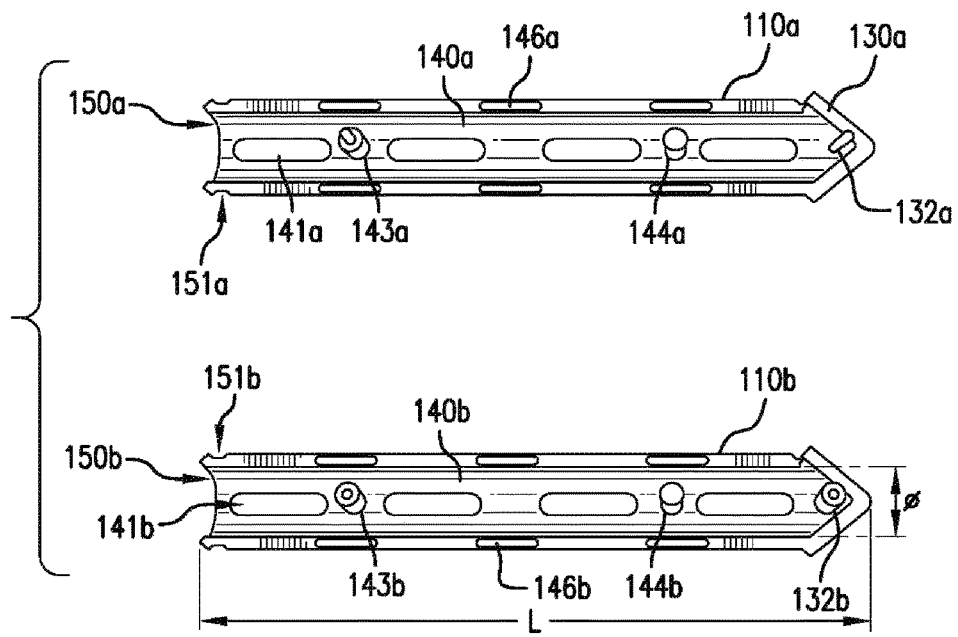
Figure 3B:
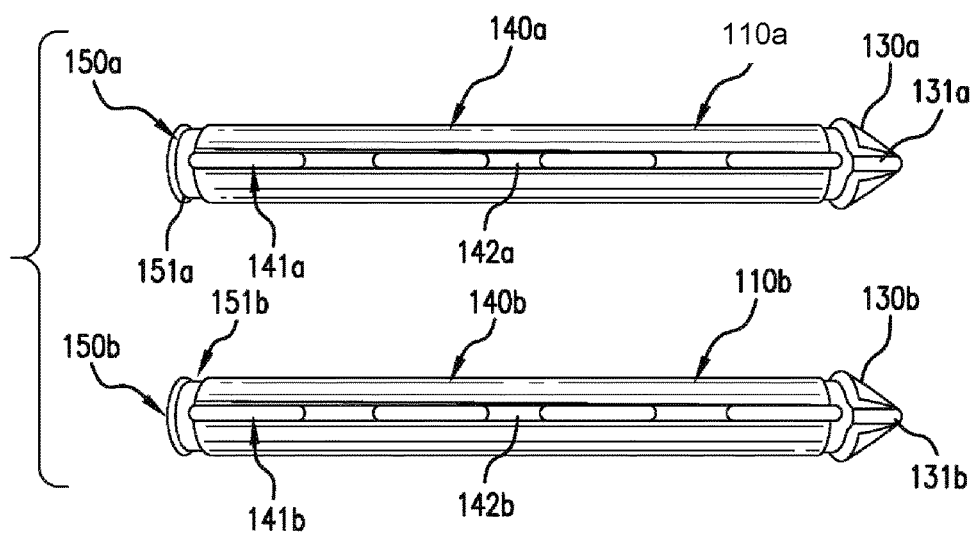

Meanwhile, the support tube member 110 may be configured as a single body or may be configured with two or more members combined. For the sake of easiness of molding, it is preferable that the support tube member 110 is configured with two or more members. In the present embodiment, the support tube member 110 is assumed to be configured with a first support tube member 110a (the first half) and a second support tube member 110b (the second half) as illustrated in FIGS. 3A and 3B. In this case, the watering member 100 is configured with the first support tube member 110a, the second support tube member 110b, and the water transfer member 120 as illustrated in FIGS. 3 and 4.

Specifically, the first support tube member 110a includes a first head portion 130a, a first body portion 140a, and a first bottom portion 150a, and the second support tube member 110b includes a second head portion 130b, a second body portion 140ba, and a second bottom portion 150b as illustrated in FIGS. 3A and 3B.

The first head portion 130a includes a first side groove 131a and a first front coupling protrusion 132a. The side groove 131a plays the same role as the side groove 131 described above. The second head portion 130b includes a second side groove 131b and a second front coupling recess 132b. The second side groove 131b plays the same role as the side groove 131 described above.

The first body portion 140a includes a first air hole 141a and a first body groove 142a. The first air hole 141a and the first body groove 142a play the same role as the air hole 141 and the body groove 142 described above. The second body portion 140b includes a second air hole 141b and a second body groove 142b. The second air hole 141b and the second body groove 142b play the same role as the air hole 141 and the body groove 142 described above. The first body portion 140a further includes a first coupling protrusion 143a and a first body support protrusion 144a, and the second body portion 140b further includes a second coupling recess 143b and a second body support protrusion 144b. The first and second body portions 140a and 140b may further include a plurality of additional coupling protrusions 146a and corresponding coupling grooves 146b for securely fixing the two body portions 140a and 140b into a single body.

The first bottom portion 150a includes a first rear fixing recess 151a, and the second bottom portion 150b includes a second rear fixing recess 151b. The first and second rear fixing recesses 151a and 151b play the same role as the rear fixing recess 151 described above.

The first support tube member 110a and the second support tube member 110b having the above-described configuration are coupled such that the coupling protrusions 132a and 143a are inserted into the coupling recesses 132b and 143b, respectively. At this time, the body support protrusions 144a and 144b serve to keep the shape of the assembled support tube members 110a and 110b so that the middle of the assembled support tube members 110a and 110b are not bent.

The self-watering system 10 having the above configuration is installed as follows. First, the first support tube member 110a is coupled and assembled with the second support tube member 110b such that the coupling protrusions 132a and 143a are inserted into the coupling recesses 132b and 143b, respectively. Then, the support tube member 110 is inserted into the water transfer member 120 so that the water transfer member 120 covers the entire support tube member 110 except the head portion 130, whereby the watering member 100 is assembled. Then, the watering member 100 is inserted into the fixing hole 210 of the grid member 200 and the fixing hole 310 of the pot support member 300 from the bottom portion 150 thereof, whereby the watering member 100 is firmly fixed. In this state, the pot support member 300 to which the watering member 100 is fixed is placed within the water container member 400 filled with water as illustrated in FIG. 9A, or the water container member 400' filled with water is placed below the pot support member 300' to which the watering member 100' is fixed as illustrated in FIG. 9B. Thereafter, the pot is placed on the pot support member 300 or 300' so that the watering member 100 or 100' is inserted into the pot through the hole formed in the bottom of the pot from the head portion 130.

In the automatic watering system installed as described above, the water in the water container member 400 or 400' is absorbed into the water transfer member 120 and transferred to the soil and the roots of the plant in the pot due to the absorption action of the water transfer member 120.

The self-watering system 10 having the above configuration has the following advantages.

According to the self-watering system 10, the water in the water container member 400 can be automatically supplied to the plant in the pot through the watering member 100. Since it is unnecessary to water the plant in the pot for an extended time period, for example, for 10 days, it is convenient.

Further, the water in the water container member 400 can be stably supplied to the roots of the plant in the pot through the watering member 100, and thus the plant is unlikely to die.

Furthermore, a sufficient amount of water can be supplied to the roots of the plant in the pot along the water transfer member 120 uniformly in the height direction.

The situation in which the water flows over the pot does not occur, and thus the pot can be kept clean.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A self-watering system for a plant, comprising:
a watering member of cylindrical shape, the watering member including a support tube member, and a water transfer member coupled to the support tube member, the support tube member including a head portion, a body portion, and a bottom portion, the head portion having a shape in which a diameter at an upper end of the head portion is smaller than a diameter at a lower end of the head portion, the body portion having a hollow cylindrical shape and including at least one air hole formed in the body portion, the bottom portion having a fixing configuration formed at an outer circumference thereof, the water transfer member serving to absorb water and transfer the water to soil and a root of a plant in a pot;
a pot support member serving to support the pot and including a fixing hole; and
a water container member for storing water to be absorbed by the water transfer member,
wherein the watering member is fixed to the pot support member such that the bottom portion of the support tube member is inserted into and fixed to the fixing hole of the pot support member,
wherein the body portion of the support tube member includes a body groove forming a recess in the hollow cylindrical shape, the body groove having a groove length extending in a longitudinal axis direction of the body portion and a groove width extending in a circumferential direction of the body portion, and the at least one air hole is formed in the body groove, the at least one air hole having an air hole length extending in the longitudinal axis direction of the body portion and an air hole width extending in the circumferential direction of the body portion, the air hole width being substantially the same as the groove width.

2. The self-watering system according to claim 1, wherein the head portion of the support tube member includes a side groove extending in a longitudinal axis direction of the support tube member, in which the side groove is in alignment with the body groove.

3. The self-watering system according to claim 1, further comprising,
a grid member including a grid and a fixing hole, wherein the fixing hole of the grid member has a diameter to allow insertion of the watering member.

4. The self-watering system according to claim 1, wherein the support tube member of the watering member and the pot support member are made of polypropylene.

5. The self-watering system according to claim 1, wherein the water transfer member is made of a material capable of absorbing and transferring water.

6. The self-watering system according to claim 5, wherein the water transfer member is made of non-woven fabric, felt, or sponge.

7. The self-watering system according to claim 1, wherein the head portion of the support tube member of the watering member has a conical or tapered shape.

8. The self-watering system according to claim 1, wherein the support tube member is formed with a first support tube member and a second support tube member,
the first support tube member including a first head portion, a first body portion, and a first bottom portion,
the first head portion including a first front groove and a first front coupling protrusion,
the first body portion including a first body groove formed in a longitudinal direction, at least one first air hole formed in the first body groove, and a first body coupling protrusion,
the first bottom portion including a first rear fixing recess,
the second supporting member including a second head portion, a second body portion, and a second bottom portion,
the second head portion including a second front groove and a second front coupling recess,
the second body portion including a second body groove formed in a longitudinal direction, at least one second air hole formed in the first body groove, and a second body coupling recess,
the second bottom portion including a second rear fixing recess formed on an outer circumference, and
the support tube member of the watering member is configured by coupling the first support tube member with the second support tube member such that the first front coupling protrusion and the first body coupling protrusion are inserted into the second front coupling recess and the second body coupling recess.

9. The self-watering system according to claim 1, wherein the pot support member is configured to be placed on the water container member.

10. The self-watering system according to claim 1, wherein the water container member is configured to be placed below the pot support member.

11. The self-watering system according to claim 1, wherein a length of the water transfer member is equal to or larger than a length of the support tube member of the watering member.

12. A self-watering system for a plant, comprising:
a watering member of cylindrical shape, the watering member including a support tube member, and a water transfer member coupled to the support tube member;
wherein the support tube member includes a head portion, a body portion, and a bottom portion;
wherein the head portion has a generally conical or tapered shape configured to facilitate insertion into a soil of a pot, wherein the body portion has a hollow cylindrical tube shape and includes a plurality of air holes formed in the body portion, and wherein the bottom portion has a fixing configuration formed at an outer circumference thereof;
wherein the water transfer member is configured to absorb water and transfer the water to the soil of the pot;
a pot support member configured to support the pot and including one or more fixing hole; and
a water container member for storing water to be absorbed by the water transfer member,
wherein the watering member is fixed to the pot support member such that the bottom portion of the support tube member is inserted into and fixed to the fixing hole of the pot support member, wherein the body portion of the support tube member includes a body groove forming a recess in the hollow cylindrical shape, the body groove having a groove length extending in a longitudinal axis direction of the body portion and a groove width extending in a circumferential direction of the body portion, and the at least one air hole is formed in the body groove, the at least one air hole having an air hole length extending in the longitudinal axis direction of the body portion and an air hole width extending in the circumferential direction of the body portion, the air hole width being substantially the same as the groove width.

13. The self-watering system according to claim 12, wherein the head portion of the support tube member includes a side groove extending in a longitudinal axis direction of the support tube member, in which the side groove is in alignment with the body groove.

14. The self-watering system according to claim 12, further comprising,
   a grid member including a grid and a fixing hole,
      wherein the fixing hole of the grid member has a diameter to allow insertion of the watering member.

15. The self-watering system according to claim 12, wherein the water transfer member is made of a material capable of absorbing and transmitting water by capillary phenomenon.

16. The self-watering system according to claim 12, wherein the pot support member includes a plurality of fixing holes configured to fix a plurality of watering members thereto.

* * * * *